Oct. 3, 1967

YUKIO MISAKA ET AL 3,344,554

DOOR OPEN-AND-CLOSE MECHANISM

Filed Oct. 5, 1964

INVENTORS:
YUKIO MISAKA
KOICHIRO SAKASHITA

BY:

INVENTORS:
YUKIO MISAKA
KOICHIRO SAKASHITA

United States Patent Office 3,344,554
Patented Oct. 3, 1967

3,344,554
DOOR OPEN-AND-CLOSE MECHANISM
Yukio Misaka, Fujisawa, and Koichiro Sakashita, Yokohama, Japan, assignors to Isuzu Motors Ltd.
Filed Oct. 5, 1964, Ser. No. 401,424
5 Claims. (Cl. 49—280)

This invention relates to a door open-and close mechanism and more particularly an automobile door open-and close mechanism.

An object of the present invention is to introduce a door open-and close mechanism which is capable of opening and closing the door of a vehicle or an automobile by an electric motor and hand as well.

Another object of the present invention is to offer a door open-and close mechanism which is capable of opening and closing the door of an automobile by an electric motor strongly or weakly in a selective manner and moreover opening and closing it also by hand.

The invention will be explained in detail with reference to the accompanying drawings.

Figure 1:
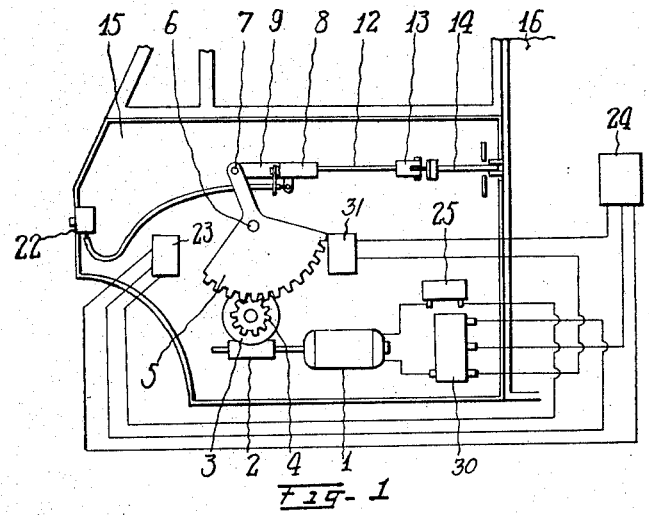
FIG. 1 is a conceptive view illustrating the mechanism of the present invention under door closed conditions.
Figure 2:
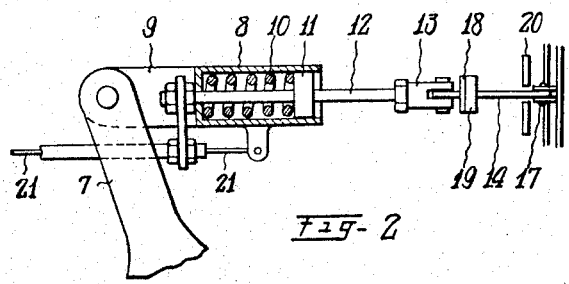
FIG. 2 is an enlarged, longitudinally sectional view of operating an engaging member for the door and cylinder means for door opening and closing.
Figure 3:
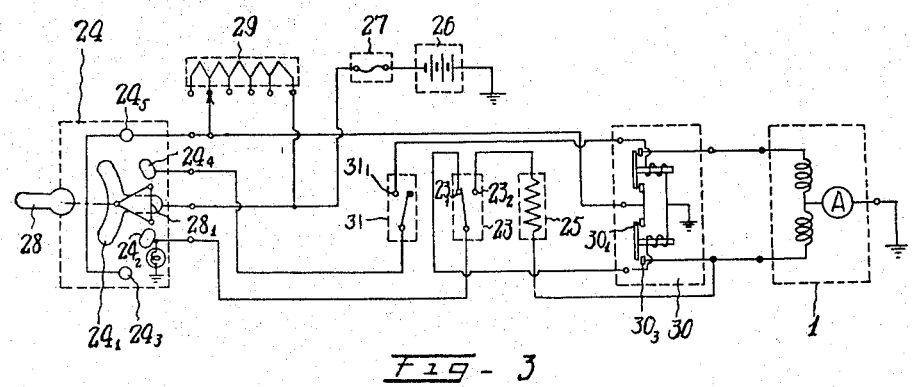
FIG. 3 is a view of an electric circuit of the present means illustrating a switch handle in neutral position.

In FIG. 1 and FIG. 3, numeral 1 shows an electric motor capable of changing the direction of its rotation freely by means of a switch 24.

A worm 2 is fixed to the output shaft of the electric motor 1 and a worm wheel 3 meshes with the worm 2.

Numeral 4 is a pinion affixed to the wormwheel 3 on the same shaft, 5 a sector gear, 6 the rotating shaft of the sector gear 5, and 7 a swing lever arranged in one body with the sector gear 5. Numeral 8 is a cylinder, one end of which is closed and the top end of said swing lever 7 is hinged to an extension 9 of said cylinder. A spring 10 is disposed in said cylinder 8. One end of the spring 10 is kept in contact with the closed end of the cylinder 8, and the other end thereof is kept in contact with a piston 11. One end of a rod 12 for the piston 11 is so arranged as to pierce through the cylinder 8 while its other end is hinged to the frame 16 of an automobile door 15 through a universal joint 13 and a connecting rod 14.

Numeral 18 is a stopper, equipped with a buffer piece 19 on one side thereof and is affixed to the connecting rod 14. Numeral 20 is a stopper affixed to the door frame 16. On the other hand, one end of a flexible shaft 21 is affixed to the cylinder 8 while its other end is connected to an engaging member 22 of the door for the car body.

Numerals 23 and 31 are limit switches and are arranged in the pivoting locus of the aforesaid sector gear 5 so that it can start to work when the door is opened or closed up to a predetermined position, and 25 a resistor and 30 a relay.

The action of this mechanism will be understood as follows. First of all, explanation is made as to how the door in closed condition can be opened. By operating the switch 24 the motor 1 is rotated in one direction to cause the sector gear 5 to rotate clockwise as shown in FIG. 1.

Then, the swing lever 7 too will swing around the rotating shaft 6 as its axis in a clockwise direction so that the top end of the flexible shaft 21 can be firstly pulled to cause the actuation of the engaging member 22 for the door 15 and thus the door 15 is brought to a position off the car body. When the cylinder 8 is further moved to the right, the piston 11 is pushed by means of the spring 10 until the rod 12 and the top end of its connecting rod 14 push the door frame 16, thereby opening the door by the counteraction of this pushing pressure. When the door is opened fully, the stopper 18 comes to impinge on the stopper 20 to prevent the door from opening any further. At this time, the sector gear 5 is caused to operate the limit switch 23 to lower the supply of electric power on the motor so that electric power sufficient for holding the door fully open can be supplied to the motor. Next, in the case of closing the door after fully opened once, the motor 1 can be rotated in a direction opposite to the aforesaid procedure by reversing the switch 24 when the sector gear 5 and the swing lever 7 are moved counterclockwise and the cylinder 8 in the left direction respectively. Consequently, the piston rod 12 and its connecting rod 14 work to pull each other between the door and door frame, thereby closing the door.

When the door is completely closed, the engaging member 22 is caused to engage the car body automatically so that the sector gear 5 actuates the switch 31 thereby stopping the rotation of the motor.

In this mechanism, both motor 1 and lever 7 are combined in such a manner that both can be reversibly rotated, not to speak in the case of a spur gear being employed as a connectively moving member between both, but even in the case of the worm 2 and the wormwheel 3.

The helix angles of the worm 2 and worm pinion 3 are sufficiently large for the worm pinion 3 to impart rotation to the worm 2, so that the door 15 can be opened and closed by hand. When opening or closing the door by hand, the door opening and closing means will be displaced and the torque transmission unit and motor 1 rotated. The possibility of opening and closing the door 15 by hand enables passengers to get in and out of the vehicle without difficulty.

The mechanism of the present invention consists in opening the engaging member 22 for the door 15 firstly by the motor 1 as a motive source, opening and closing the door 15 by means of the spring 10 and at the same time, permitting the rotor of the motor to rotate by hand thereby opening and closing the door 15 which facilitates get-in and get-off movements of passengers to a great advantage.

FIGS. 3 to 7 show an electric circuit for use in combination with the above-mentioned mechanism. This electric circuit utilizes the battery disposed in the car as a power source and consists of substantially four circuits connected to the motor for opening and closing the door which can be selected by means of a hand switch.

Two circuits in this circuit are so formed as to contain an electric resistor therein and used for purposes of opening and closing the door by weak force.

The other two circuits are so formed as to cause electric current to avoid the resistor and used for purposes of opening and closing the door by strong force.

Moreover, two circuits for purposes of opening the door by weak or strong force out of said four circuits are so designed as to form a circuit for rotating said motor in one and the same direction while two circuits for purposes of closing the door by weak or strong force are so constituted as to form a circuit for rotating said motor in the other same direction.

The combination of the above-mentioned mechanism and this electric circuit is visualized by the provision of the afore-said four circuits and a micro-limit-switch at each end of the reciprocating movement of the swing lever 7 for opening and closing the door so that all the circuits may be opened at the time of door closing and the full-open door be supported so by means of the door-open circuit having a holding resistor.

Next, with reference to FIGS. 3–7, each circuit will be explained relating to the mechanism of the present invention.

In FIGS. 3 to 7, numeral 1 is a motor, 23 and 31 are limit switches, 24 an operating swich, 25 a holding resistor for use at the time of keeping the door full open, 26 a battery, 27 a fuse, 28 a switch handle, 29 a resistor with taps affixed thereto and 30 a relay.

All these elements are common throughout the circuits shown in FIGS. 3 to 7.

The handle 28 of the switch 24 for opening and closing the door shown in FIGS. 3–7 is kept in neutral condition automatically by means of a spring (not shown) at ordinary times. (See FIG. 3.) In this case, electricity is conducted to a contact plate $24_1$ of the switch 24 through the battery 26, fuse 27.

(a) Door opening by weak force

Figure 4:
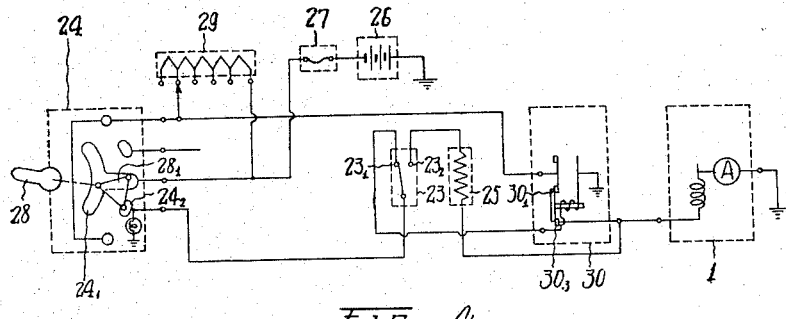
FIG. 4 is a view of an electric current for use at the time of door opening by weak force.

In the circuit shown in FIG. 3, when the switch handle 28 is swung to the position shown in FIG. 4, the switch piece $28_1$ is brought into contact with the contact plates $24_2$ and $24_1$, so that the electricity conducted up to the contact plate $24_1$ may pass through the contact $24_2$ and flow up to the relay 30 because of the limit switch 23 being kept in contact with the contact $23_1$ thereby actuating the relay by magnetic force until the contacts $30_1$ and $30_3$ can be closed and the resistor 29 becomes involved in the circuit. Thus this circuit serves to give the motor 1 such electricity as has been weakened by means of said stationary resistor 29.

The rotation of the motor 1 is transmitted to the sector gear 5 and this movement may contract the spring 10 in the cylinder 8 and simultaneously pull the flexible shaft 21 to disengage the engaging member 22 for the door from the car body and the piston rod 12 and its connecting rod 14 start to open the door. When the sector gear 5 or the other portion of reciprocating movement reaches the position of the limit switch 23, its contact $23_1$ may be switched to its other contact $23_2$. Then the relay 30 is returned to its original state thus cutting off the connection of the contacts $30_1$ and $30_3$. On the other hand, the limit switch 23 acts to close the contact $23_2$ to involve the resistor 25 for supporting the door full open in the circuit so that much more weakened current can be conducted to the motor 1.

Consequently, when the door is opened more than a predetermined angle by means of the switch 23, electric current may pass through the resistor 25 so that the speed of opening the door may be decreased thus decreasing the possibility of danger and at the same time, when the door tends to close due to its own weight, the motor can keep the door open without force.

After the door is fully opened, the resilient stopper 18 impinges on the stopper 20 affixed to the door thus preventing the door from opening any further.

After the handle 28 is held firm until said condition is reached and when the hand is separated from it, the switch 24 for opening and closing the door can be brought back to the neutral position automatically (see FIG. 3) and door opening be completed.

(b) Door opening by strong force

Figure 5:
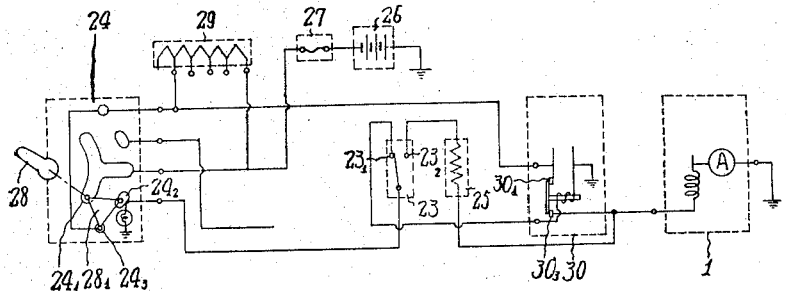
FIG. 5 is a view of an electric circuit for use at the time of door opening by strong force.

When the handle 28 is swung to the door-open position as shown in FIG. 5 and the switch piece $28_1$ is brought into contact with the contact pieces $24_1$, $24_2$ and $24_3$ for support, the electricity coming up to the contact piece $24_1$ is conducted to the contact pieces $24_2$ and $24_3$ so that the circuit shown in FIG. 5 can be formed thereby permitting the motor 1 to rotate. In this circuit the stationary resistor 29 does not work. In other words, although the resistor 29 is involved in this circuit, no influence occurs due to the presence of said resistor 29 because plenty of the electricity flows through the lines in the absence of the resistor. Consequently, in this case, strong electricity is destined to be supplied to the motor 1 so that door opening by strong force can be performed. Moreover, it is made possible to switch from strong force to weak force or vice versa during door open-and close operation.

(c) Door closing by weak force

Figure 6:
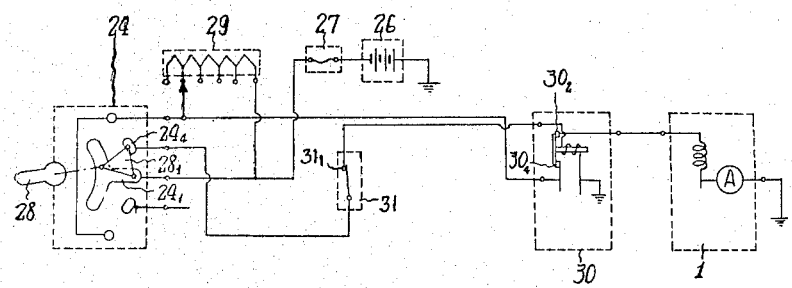
FIG. 6 is a view of an electric circuit for use at the time of door closing by weak force.

As shown in FIG. 6, when the switch handle 28 is swung until the switch piece $28_1$ is held firm ranging over the contact pieces $24_1$ and $24_4$, electricity is caused to flow from the switch contact piece $24_1$ to $24_4$ from which it passes through the limit switch 31 up to the relay 30.

Then the contacts $30_2$ and $30_4$ of said relay are closed so that the motor 1 comes to rotate by means of electricity flowing through the resistor 29, provided that the mode of said rotation is opposite to the direction of rotation in the case of door opening.

When the motor 1 comes to rotate, door closing will start regardless of the engaging member 22 for the door 15. Just immediately before the completion of door closing, the contact $31_1$ of the limit switch 31 is separated therefrom so that the door can move by moment of inertia of door closing even after the contact $31_1$ of the limit switch has been cut off until door closing is completed. In this case, the limit switch 31 serves to cut off electricity for the motor.

In this manner, when separating the hand from the handle 28 of the operating switch 24, said handle can be brought back to the neutral position automatically.

(d) Door closing by strong force

Figure 7:
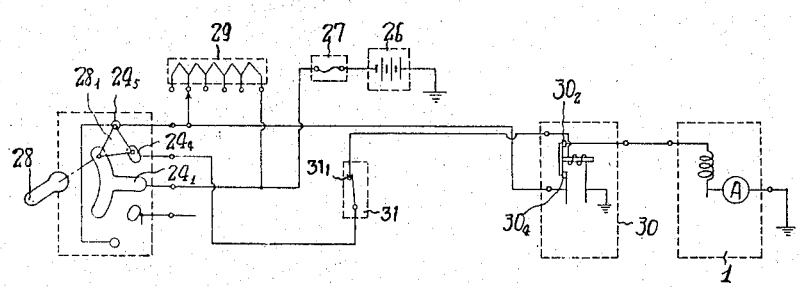
FIG. 7 is a view of an electric circuit for use at the time of door closing by strong force.

As shown in FIG. 7, when the switch 28 for opening and closing the door is swung to the door-close position by strong force and the switch piece $28_1$ is brought into contact with the contact pieces $24_1$, $24_4$ and $24_5$ for support, electricity is conducted to flow through the contact pieces $24_1$ and $24_4$ and then the limit switch 31 up to the relay 30 so that the contacts $30_2$ and $30_4$ can be connected. In this manner, electricity is destined to flow through the contact piece $24_1$ and the contacts $24_5$, $30_4$ and $30_2$ up to the motor 1 for rotating the same.

Also in this case, although the resistor 29 is involved in this circuit as it is, no influence occurs due to the presence of said resistor because there is a short circuit occurring in the parallel lines in the absence of the resistor.

Consequently, strong electric current is supplied to the motor for door opening by strong force.

(e) Door opening and closing by hand

The handle 28 of the operating switch 24 is held in the neutral position at usual times (see FIG. 3) so that electricity cannot be conducted to the motor.

In this embodiment of the present invention, the connectively moving apparatus for transmitting power from the motor 1 to the piston rod 12 is so designed as to rotate reversibly. Therefore, when the door 15 is to be opened or closed by hand, it is possible to open or close it by hand operation easily. In this case, the rotor of the motor 1 is caused to rotate by manual force.

Moreover, the above-mentioned reason holds good in offering the possibility of operating the door in the direction of opening by hand even during electric door opening and also of operating the door in the direction of closing even during electric door closing respectively.

In conclusion, the apparatus of the present invention has a great advantage in that power source can be obtained from electricity being already used by the car and a door open-and close mechanism by two modes of force is available, i.e., strong force and weak force as applied to door opening and closing and moreover free door opening and closing can be carried out even by hand.

What is claimed is:

1. Door opening and closing mechanism for a door on the frame of a car, comprising:
   (a) a reversibly rotatable motor having a drive shaft;
   (b) a gear-type transmission means connected to said drive shaft and having a rotational output;
   (c) a swing lever fixedly connected to said rotational output means and extending laterally from the rotational axis thereof;
   (d) means to limit the swing of said swing lever between a door-open position and a door-closed position;
   (e) a door locking means operable to lock and release the door;
   (f) a connection means to transfer movement of said swing lever to said door locking means for the operation thereof, release occurring when said swing lever leaves said door-closed position and locking occurring as said swing lever returns into said door-closed position;
   (g) a reversibly movable means operable to open and close the door;
   (h) and a resilient means connected between said reversibly movable means and said swing lever for the resilient transfer of movement of said swing lever to operate said reversibly movable means when said door locking means has released the door.

2. A mechanism as claimed in claim 1,
   said resilient means comprising: a cylinder pivotably connected to said swing lever away from the rotational axis of the transmission output, said cylinder having a closed end; a piston inserted in said cylinder; a spring interposed between the said piston and the closed end of said cylinder;
   said reversibly movable means comprising: a piston rod connected fixedly to said piston and a connecting rod, said connecting rod being connected at one of its ends to said piston rod and to said frame at its other end;
   said connection means being a flexible cable and a conduit therefor, said flexible cable being connected at one end to said door locking means and at its other end to said cylinder.

3. A mechanism as claimed in claim 1, further comprising an electric source, a first circuit means, containing said electric source, for rotating said motor and said swing lever in the direction from the door-closed position to the door-open position; a second circuit, containing said electric source, for rotating said motor and said swing lever in the direction from the door-open position to the door-closed position; said circuits including switch means to control the direction of rotation of said motor; a limit circuit located in said first circuit means and containing said limit switch; said limit switch closing said circuit by means of the motion of said swing lever before the door is fully open; said limit circuit containing means to supply weak electric current to said motor and hold the door in an open position when said limit circuit is closed.

4. A door opening and closing mechanism for a door on the frame of a car, comprising: a reversibly rotatable motor, a worm gear connected to the output shaft of said motor, a worm wheel meshing with said worm gear, a pinion gear fixed coaxially to said worm wheel, a segment gear meshing with said pinion, a swing lever integral with said segment gear, reversibly movable means operable to open and close said door against the car frame, a spring connected between said swing lever and said reversibly movable means for the resilient transfer of movement of said swing lever to operate said reversibly movable means, a door locking means operable to lock and release the door, and a flexible cable means connected between said swing lever and said door locking means to transfer movements of said swing lever without lost motion to operate said door locking means, whereby the swinging movement of said swing lever is firstly transmitted to release the door lock and whereby the releasing is followed by door opening action.

5. A door opening and closing mechanism for a door on the frame of a car, comprising: a reversibly rotatable motor, a gear-type transmission means connected to the output shaft of said motor, a swing lever fixedly connected to the rotational output of said transmission means and extending laterally from the rotational axis thereof, means to limit the swing of said swing lever between a door-open position and a door-closed position, means connected to said swing lever whereby swinging motion of said lever is utilized to open and close the car door; a direct current supply source, a plurality of circuit means containing said electric source, for rotating said motor, a limit switch disposed near the door-open limit of the swing movement of said swing lever, a limit circuit located in said circuits and containing said limit switch, said swing lever engaging with said limit switch and thereby closing said limit circuit before full door opening, said circuits containing means to supply weak electric current to said motor and hold the door in an open position when said limit circuit is closed.

References Cited

UNITED STATES PATENTS

| 2,472,646 | 6/1949 | Cochran | 318—305 |
| 2,492,639 | 12/1949 | Hunter | 318—305 |
| 2,696,579 | 12/1954 | Van Der Veer | 49—139 X |
| 2,737,621 | 3/1956 | Hamilton. | |
| 3,069,151 | 12/1962 | Cook et al. | 49—280 |
| 3,069,152 | 12/1962 | Arlauskas et al. | 49—319 |
| 3,154,302 | 10/1964 | Maruyama | 49—280 |
| 3,237,932 | 3/1966 | Catlett | 49—139 X |

DAVID J. WILLIAMOWSKY, *Primary Examiner.*

HARRISON R. MOSELEY, REINALDO P. MACHADO, *Examiners.*

J. K. BELL, *Assistant Examiner.*